United States Patent [19]

Goodwin et al.

[11] Patent Number: 4,720,163
[45] Date of Patent: Jan. 19, 1988

[54] LASER-FIBER POSITIONER

[75] Inventors: John C. Goodwin; Tibor F. Devenyi, both of Nepean, Canada

[73] Assignee: Northern Telecom Limited, Montreal, Canada

[21] Appl. No.: 752,983

[22] Filed: Jul. 8, 1985

[51] Int. Cl.$^4$ .............................................. G02B 6/36
[52] U.S. Cl. .......................... 350/96.20; 350/96.10; 350/96.24; 350/355; 310/318
[58] Field of Search ............. 350/96.10, 96.12, 96.13, 350/96.14, 96.20, 355, 360; 310/311, 317, 328

[56] References Cited

U.S. PATENT DOCUMENTS

| | | | |
|---|---|---|---|
| 3,310,978 | 3/1967 | Davis | 350/96.24 X |
| 3,394,976 | 7/1968 | Hawkins | 350/96.24 X |
| 3,442,570 | 5/1969 | Picker | 310/311 X |
| 4,212,513 | 7/1980 | Gravel | 350/96.14 |
| 4,280,756 | 7/1981 | Albertinetti | 350/360 |
| 4,382,243 | 5/1983 | Babitzka et al. | 310/328 |
| 4,384,230 | 5/1983 | Wisner | 310/328 |
| 4,394,061 | 7/1983 | Schroeder | 350/96.20 |
| 4,565,940 | 1/1986 | Hubbard, Jr. | 310/328 X |

Primary Examiner—William L. Sikes
Assistant Examiner—Akm E. Ullah
Attorney, Agent, or Firm—Schwartz, Jeffery, Schwaab, Mack, Blumenthal & Evans

[57] ABSTRACT

To position a light output device such as a laser diode relative to a light device such as a waveguide so as to obtain maximum coupling of light, the waveguide end facing the laser is vibrated by mechanical means to modulate the coupled light. Light is detected from a remote end of the fiber and a corresponding electrical signal is generated. Positional information contained in the oscillatory component of the signal is decoded and applied to a positioning device which then reduces misalignment between the waveguide and laser. The positioning device continuously seeks the maximum coupling position. The technique finds particular application in positioning a waveguide in a laser package prior to and during anchoring.

6 Claims, 3 Drawing Figures

4,720,163

LASER-FIBER POSITIONER

BACKGROUND OF THE INVENTION

This invention relates to a method and apparatus for positioning a light output device such as a laser diode relative to a light input device such as the end surface of an optical waveguide so as to maximize light launched from the diode laser into the waveguide.

Conventionally in the assembly of laser diode packages, in order to achieve a maximum amount of light coupled into a fiber from a laser, micropositioners are used to manipulate the fiber manually in front of the lasing junction. Light from a remote end of the fiber or fiber pigtail is detected and generates a DC level. The fiber is manipulated in front of the laser in a liquid epoxy or low melting point solder and when the DC level is at a maximum, the epoxy is allowed to cure or the low melting point solder is cooled to solidification.

The procedure is very time consuming and requires a long training period to acquire the necessary high degree of manual dexterity and coordination. A more rapid and accurate positioning method is proposed by the present invention.

SUMMARY OF THE INVENTION

According to the invention a light output device is positioned relative to a light input device to couple maximum light from the output device to the input device by initially positioning the devices so that generally light from the output device is directed at the input device. One of the devices is then vibrated in a first direction and light received by the input device is detected and used to generate an electrical signal. The amplitude of an oscillatory component of that electrical signal corresponding to the impressed vibration is detected. Also the phase relationship between that component and impressed vibration is detected. Based on the detected amplitude and phase relationship a force is applied to one of the devices to effect translational movement of the device in said first direction to minimize said amplitude.

In one embodiment of the invention, the light input device is an end surface of an optical waveguide such as a package pigtail fiber of a laser diode package and the light output device is a laser diode. Particularly for anchoring a fiber in a laser package, the laser diode is fixed in position and an end portion of the waveguide is vibrated relative to a mass of liquid epoxy resin using a piezoelectric crystal. The piezoelectric crystal can also be used to effect said translational movement.

A pair of such piezoelectric devices can be used, the devices energizable to move the fiber end in orthogonal directions whereby to position the fiber end portion in a plane perpendicular to the fiber axis. The piezoelectric active surfaces can be connected to respective connecting rods, the rods fused together and having a remote holder portion positioned around the fiber end portion.

In order to distinguish oscillatory components in said orthogonal directions, the crystals of the two piezoelectric devices can be driven with different vibrational frequencies.

BRIEF DESCRIPTION OF THE DRAWINGS

An embodiment of the invention will now be described by way of example with reference to the accompanying drawings in which.

DESCRIPTION OF THE PREFERRED EMBODIMENT

Figure 1:
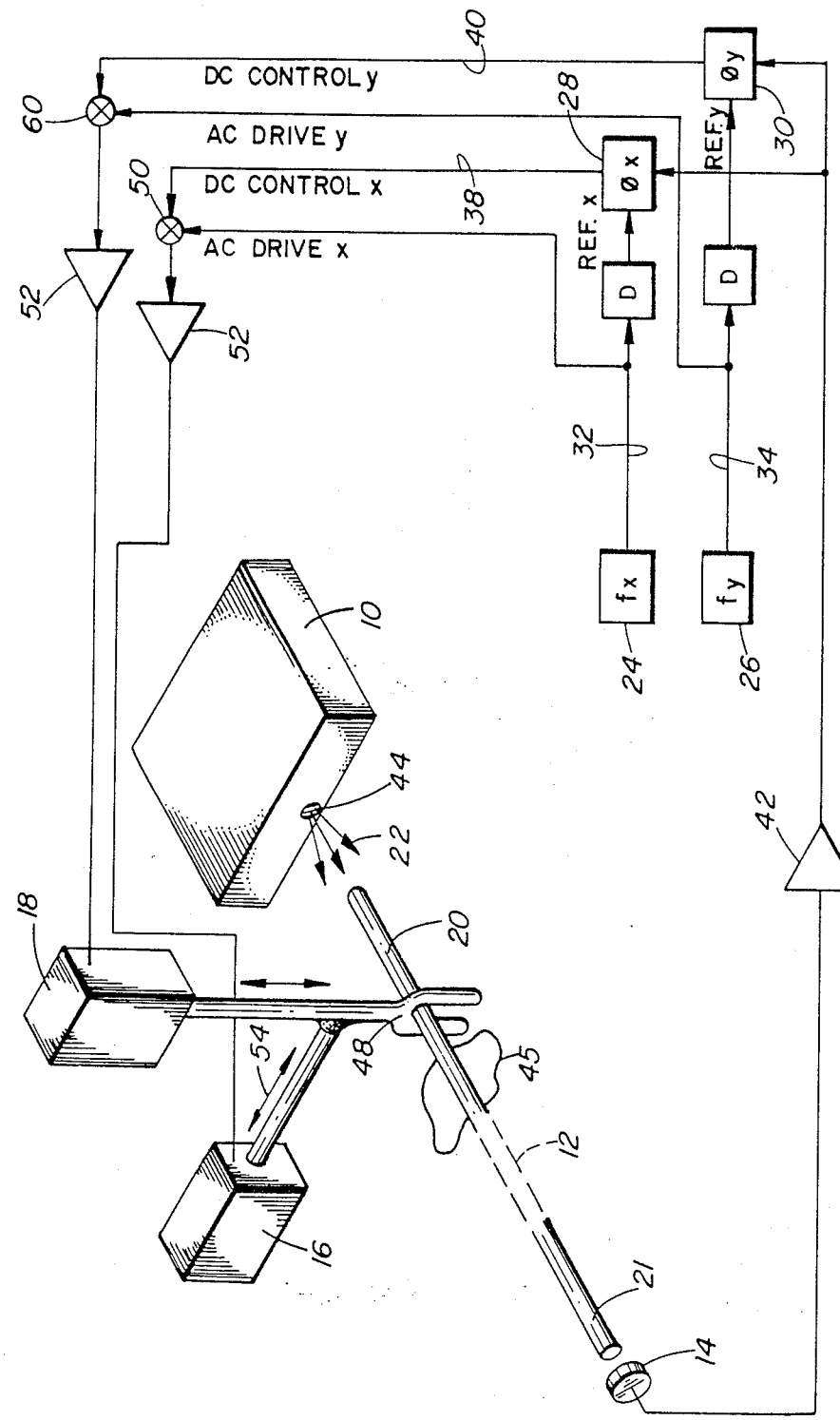
FIG. 1 shows partly in perspective and partly in circuit schematic form, apparatus according to the invention.

Referring in detail to FIG. 1, there is shown a laser diode 10, a pigtail fiber 12, and an optical detector 14. A piezoelectric crystal 16, drives the fiber end 20 in the x-direction in response to an oscillatory signal at freqeuncy $f_x$ from a generator 24 summed with a DC level 38 from a phase sensitive detector 28. Similarly a piezoelectric crystal 18 drives the fiber end in the y-direction in response to an oscillatory signal at a frequency $f_y$ from a generator 26 summed with a DC level 40 from a phase sensitive detector 30. The DC levels are derived by detecting variation in coupled light resulting from the impressed modulation at $f_x$ and $f_y$ and are maintained at levels which maximize the coupled light.

Figure 2:
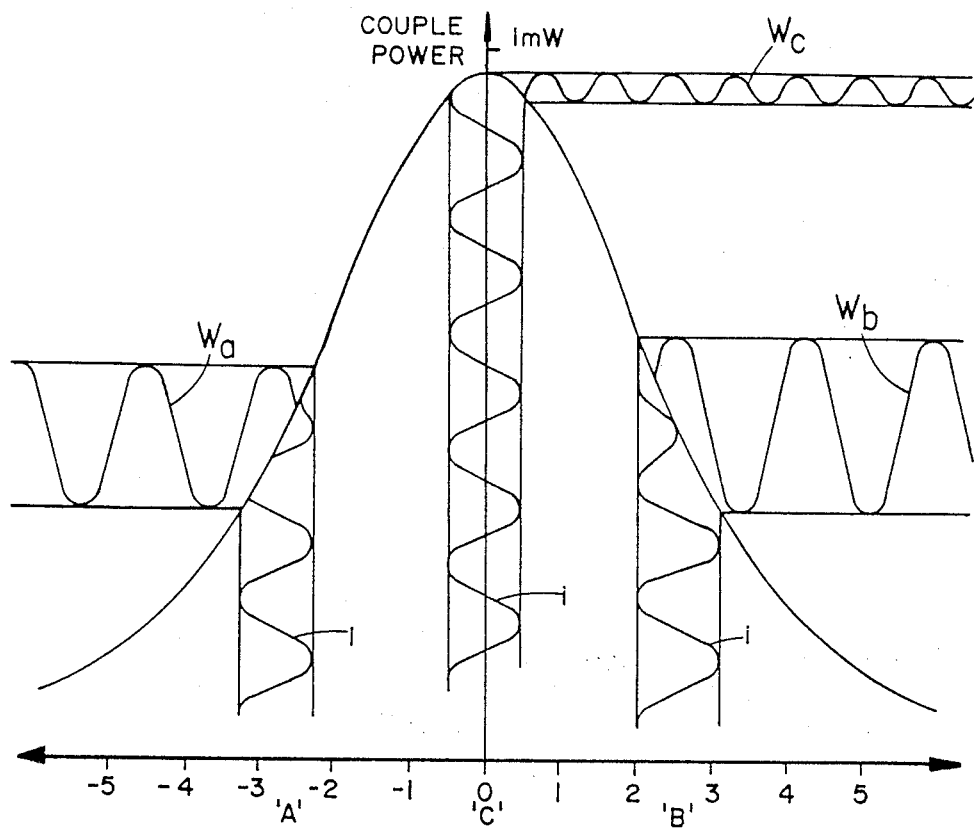
FIG. 2 shows in graphical form the variation in coupling efficiency between a laser diode and an optical waveguide resulting when the input end of the waveguide is vibrated.

The invention finds particular application in the assembly of a laser diode package. In the package, the laser diode chip 10 is normally bonded to a heat sink. The pigtail fiber 12 passes through a hermetic seal in the wall of a package housing and an end portion 20 of the fiber rests over a pedestal the height of which is marginally lower than the height of the lasing junction within the laser chip 10. An important step in the assembly of a laser diode package is the accurate positioning of the pigtail fiber end 20 to maximize light launched from the laser chip 10. Typically at a distance of several tens of microns from the laser emitting facet, the light coupling profile is as shown in FIG. 2 and spreads over a diameter of 5 to 10 microns, the pigtail fiber itself typically having a core radius of 10 microns. To maximize light coupling from the laser chip 10, the fiber pigtail end portion 20 can be both tapered and rendered bulb ended to provide a lens action. Even so, the most important consideration in maximizing light launched into the fiber 12 is in having the axis of the fiber end portion 20 accurately aligned with laser emitting spot 44.

In the method of the present invention, light coupled from laser 10 into the fiber near end 20 is detected at a remote end 21 by a PIN or avalanche photodiode 14 mounted to receive light from the pigtail fiber. A corresponding detector output is taken through an amplifier 42 to a signal analysing circuit including the phase sensitive detectors 28, 30. The fiber end 20 is moved in a mass of liquid epoxy 45 by energizing piezoelectric crystals 16, 18. Crystals 16 and 18 produce x and y-directional movement, respectively, where the fiber axis extends along the z-direction, the x and y movement being combined at a fork arrangement 48. Although details of the piezoelectric crystal mounting arrangement are not shown, it is understood that through the independent action of the crystals the fork 48 can be moved to any spot within a predetermined zone of the xy plane.

Drive to the piezoelectric crystals 16, 18 is applied from drive generators 24, 26 which generate oscillatory signals at respective frequencies $f_x$ and $f_y$. The frequencies selected are not harmonically related. For effective operation of the phase sensitive detectors, $f_x$ and $f_y$ are greater than 10 Hz and are separated by at least 10 Hz to allow easy discrimination. A first output signal from each drive generator is taken through a summing junction 50 to a drive amplifier 52 and then applied to its corresponding piezoelectric crystal.

Second outputs from the drive generators 24, 26 are applied, following a delay D, as reference signals to respective phase sensitive detectors 28, 30. The reference signals permit the phase relationship between the applied vibration and the detected signal to be determined. If the signals are in phase then the fiber end 21 must be moved in one direction to increase coupling whereas if the signals are out of phase then the fiber end must be moved in the opposite direction.

Figure 3:
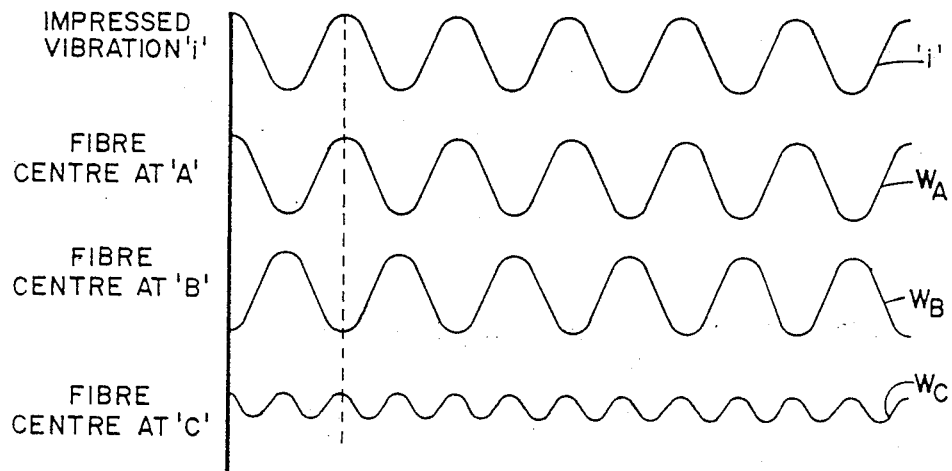
FIG. 3 shows the vibration and oscillatory component of detected light applied to a common time base.

The light coupling efficiency between the laser output facet and fiber as a function of misalignment in the x-direction is typically as shown in FIG. 2. Ideally the fiber is positioned at a point C corresponding to the fiber and laser being accurately aligned at the x-direction. In fact, after initial positioning of the fiber end relative to the laser, the fiber is typically at a position 'A 2 or 'B' on one side or other of the optimal position 'C'. When the signal at frequency $f_x$ is applied to the piezoelectric crystal 16, the fiber end is oscillated as represented by arrow 54 and waveform 'i'. At the detector 14, a corresponding electrical signal is generated having in addition to a DC component, an oscillatory component Wa, Wb or Wc depending on the median position of the fiber. For accurate alignment, the fiber should be in a position in which the amplitude of the oscillatory component is minimized as shown by waveform Wc. The waveforms are shown with a common time base in FIG. 3 which also shows their phase relationship. The phase sensitive detector 28 is tuned to frequency $f_x$ and, dependent on the amplitude and phase difference between the input signal from the drive generator 24 and that from the detector 14, a DC control signal is generated which is summed with the AC drive from drive generator 24 at the summing junction 50. The control signal is used to effect x-direction translational movement of the active surface of piezoelectrical crystal 16 and thereby the pigtail fiber end 20. As shown in FIG. 3, it is evident from the amplitude of waveforms Wa and Wb that movement of the fiber is required to provide effective alignment. Moreover it is clear from the phase relationship of Wa and Wb relative to waveform 'i' in which direction the fiber should be moved to effect alignment.

A corresponding adjustment is effected in the y-direction by vibrating the fiber end 20 at a different frequency $f_y$ and analysing the $f_y$ oscillatory component of the detected signal to derive its amplitude and phase relationship to the impressed modulation.

As previously indicated, this method finds particular application in fixing a fiber relative to a laser chip. In a particular implementation of that method, the fiber end portion 20 is held in a mass of epoxy resin with the fiber end surface itself clear of the epoxy mass to permit light to be coupled directly into the fiber. The epoxy is cured once the x and y control loops have been energized to fix the fiber end portion in its most effective position. It has been found that as epoxy resin is cured, the fiber end portion 20 can be moved of the order of 1 micron merely as a result of the curing mechanism. With the dynamic method described, if there is some movement of the fiber during curing, a restorative force is applied during the initial curing stage.

Although the invention has been described in terms of a pigtail fiber 12 being fixed relative to a laser chip 10, the method can be used to precisely align other fiber optic input and output devices. Thus the method can be used in alignment fibers for coupling light at a connector or splice site. It will be appreciated that although in this particular embodiment the light input device is vibrated, in an alternative embodiment the light input device can be fixed and the light output device vibrated.

The arrangement described above uses the same piezoelectric device to effect both the applied vibration and the translational movement. It will be understood that different mechanisms may be used for these different tasks. For instance, the vibration can be applied sonically using a loudspeaker, and the piezoelectric devices used only to effect the restoring translational movement of the fiber.

A primary conceptual difference between the present invention and existing approaches to laser-fiber alignment is that existing techniques depend only on directly maximizing the amount of light coupled from the laser into the fiber. In contrast, the present invention operates by minimizing the derivative of the coupled light with respect to small spatial perturbations of the fiber. With conventional alignment techniques a gross mechanical motion of the fiber or laser is needed to determine by comparing old and new values of the coupled light whether or not the laser-fiber combination is aligned and, if not, in which direction the position of best alignment lies. Because of the derivative nature of this invention, directional and degree of alignment information are available instantaneously. This can in turn allow simultaneous alignment in both the x and y-directions.

What is claimed is:

1. Apparatus for positioning a light output device relative to a light input device to obtain maximum light coupling therebetween;

the apparatus comprising means for vibrating one of the devices;

a photodetector connected to the input device for detecting light received by the input device and;

means for generating an electrical signal in response to the detected light;

the apparatus characterized by: a phase sensitive detector for detecting amplitude of an oscillatory component of the electrical signal and for detecting the phase difference between said oscillatory component and the vibration applied to said one device, the oscillatory component resulting from vibrating said one of the devices; and means responsive to the amplitude and phase of the oscillatory component, for applying a force to translationally move one of the devices in a direction so as to reduce said amplitude to a minimum.

2. A method of positioning a light output device relative to a light input device to obtain maximum light coupling between the devices, the method comprising:

positioning the devices so that generally light from the output device is directed at the input device;

vibrating one of the devices at a frequency $f_x$ along a first axis;

detecting light received by the input device;

generating an electrical signal in response to the detected light, detecting both the amplitude of an oscillatory component of that electrical signal and the phase relationship between that component and the vibration applied to said one device, the oscillatory component resulting from vibrating said one of the devices; and applying a force in response to the amplitude and phase of the oscillatory component, to translationally move one of the devices along said first axis such as to reduce said amplitude to a minimum.

3. A method as claimed in claim 2 in which the light output device is a laser diode and the light input device is a pigtail fiber, the pigtail fiber and the laser forming part of a laser diode package.

4. A method as claimed in claim 2 in which a piezoelectric crystal is used to effect both vibration and translational movement of said one device.

5. A method as claimed in claim 2 in which said first axis is an x-axis, the method further comprising vibrating said one device at a frequency $f_y$ along a y-axis perpendicular to said x-axis, detecting the amplitude of an oscillatory component at frequency $f_y$ in said electrical signal, detecting the phase relationship between said component at $f_y$ and the vibration applied to said one device at said frequency $f_y$, and applying a force to effect translational movement of said one device along the y-axis.

6. A method as claimed in claim 5 in which a pair of piezoelectric devices are used, one to effect motion of said one device along the x-axis and the other to effect motion of said one device along the y-axis, the piezoelectric devices having respective active surfaces connected to a control arrangement whereby movement of said piezoelectric device active surfaces is combined at said one device.

* * * * *